Patented July 23, 1946

2,404,436

UNITED STATES PATENT OFFICE 2,404,436

ISOMERIZING HYDROCARBONS

Chester C. Crawford, El Cerrito, and David Louis Yabroff, Alameda, Calif., assignors to Shell Development Company, San Francisco, Calif., a corporation of Delaware No Drawing. Application November 17, 1942, Serial No. 465,926

4 Claims. (Cl. 260—683.5)

This invention relates to the catalytic isomerization of saturated hydrocarbons and relates more particularly to an improved process for the catalytic conversion of normal or branched chain saturated hydrocarbons, having at least five carbon atoms to the molecule, to branched or more highly branched chain saturated hydrocarbons having the same number of carbon atoms to the molecule.

Catalysts of the Friedel-Crafts type are known to catalyze the hydrocarbon isomerization reaction. However, these catalysts are also effective in catalyzing the decomposition of hydrocarbons. In the isomerization of a more stable hydrocarbon, it is sometimes possible to favor the isomerization reaction by a judicious selection of temperature and pressure conditions to such a degree that conversion to the desired isomer is attained with a minimum of hydrocarbon decomposition. Processes are presently in use which enable the efficient conversion of butane to isobutane with but little undesired side reactions. Many other hydrocarbons, such as, for example, the saturated open chain hydrocarbons having five or more carbon atoms to the molecule are, however, particularly prone to undergo decomposition in the presence of isomerization catalysts. Even in some of these cases, the undesirable side reaction can be suppressed to some degree by the use of sufficiently mild operating conditions. Such conditions often will be so mild, however, as to make the attainment of conversions and yields indicative of a practical operation impossible. On the other hand, to use temperature conditions more favorable to the isomerization reaction in the treatment of these hydrocarbons in the absence of agents capable of suppressing hydrocarbon decomposition generally results in the presence of the hydrocarbon decomposition reaction to a degree precluding efficient operation of the process.

By the term "decomposition" as used throughout this specification and the attached claims is meant the rupture of carbon to carbon and/or carbon to hydrogen bonds of the hydrocarbon molecule to result in the formation of hydrocarbons of lower molecular weight than the hydrocarbon treated. The detrimental effect of the hydrocarbon decomposition reaction upon the isomerization process manifests itself in many ways, any one of which is generally sufficient to render the process impractical. This reaction causes the loss of substantial amounts of the charge by converting it to materials other than an isomeric form of the material treated possessing the same number of carbon atoms to the molecule. This loss in the treatment of the more readily degraded hydrocarbons such as pentane, methyl pentane, and the like, in many of the processes utilized heretofore, at temperatures enabling the attainment of even a moderate rate of isomerization, often is so great as to occasion the loss of the greater part of the material charged. A still greater detrimental effect occasioned by the hydrocarbon decomposition in the presence of the Friedel-Crafts type catalysts is the rapid deterioration of the catalyst brought about by the products of this reaction.

Much effort has been expended in attempts to control the tendency of the Friedel-Crafts type catalysts, and particularly the aluminum halides, to catalyze the decomposition of hydrocarbons in non-destructive hydrocarbon conversion processes to thereby enable the desired reaction to predominate. Good results have been obtained in certain processes by the maintenance of a high partial pressure of hydrogen in the reaction zone. The use of this gas, particularly at the high pressures usually required to render it effective, increases initial and operating costs considerably and introduces difficulties and hazards of operation which often act as serious deterrents to practical operation.

It has now been found that isomerizable hydrocarbons can be catalytically isomerized in the absence of substantial hydrocarbon decomposition and without the need for recourse to the use of normally gaseous cracking suppressors by introducing into the reaction zone an aromatic compound of the hydrogen-donor type. By the term "aromatic compounds of the hydrogen-donor type" or "aromatic hydrogen-donor," as used throughout this specification and the attached claims, is meant an organic aromatic compound capable of liberating hydrogen under the conditions of execution of the isomerization reaction. In accordance with the present invention, a hydrocarbon stream comprising an isomerizable saturated hydrocarbon is contacted with an isomerization catalyst of the Friedel-Crafts type at isomerizing conditions in the presence of an added aromatic hydrogen-donor.

The invention may be applied to the isomerization of any isomerizable saturated hydrocarbon. It is applied with particular advantage, however, to the isomerization of the more readily degraded hydrocarbons, such as, for example, the open chain paraffinic hydrocarbons having at least five carbon atoms to the molecule of normal and branched structure. The invention is not limited to the treatment of materials consisting essentially of a single hydrocarbon. It may be applied to the treatment of hydrocarbon mixtures which may comprise not merely one isomerizable hydrocarbon but in addition one or more other saturated hydrocarbons which may or may not be capable of isomerization under the conditions of execution of the process. While the invention is applied with particular advantage to the isomerization of saturated open chain or paraffinic hydrocarbons, it may be applied to the treatment of isomerizable naphthenic hydrocarbons, such as, for example, methyl cyclopentane, dimethyl cyclopentane, methyl cyclohexane, or hydrocarbon mixtures comprising them. The invention may also be applied to the treatment under isomerizing conditions of hydrocarbon fractions comprising substantial amounts of isomerizable hydrocarbons, such as, for example, fractions of straight run gasoline, casinghead gasoline, fractions of the distillate products obtained in the thermal or catalytic conversion of hydrocarbons, etc.

The hydrocarbons or hydrocarbon mixtures treated are preferably substantially free of materials, the presence of which adversely affects the activity of the catalyst. Olefins, diolefins, aromatic hydrocarbons, or other detrimental impurities in the hydrocarbon or hydrocarbon mixture to be treated are preferably removed prior to isomerization by a suitable treatment which may comprise one or more of such steps as mineral acid refining, hydrogenation, alkylation, contact with clay or with part of the spent catalyst, solvent extraction, etc.

The isomerization process may be carried out with any of the known isomerization catalysts. Suitable isomerization catalysts are, for example, those of the Friedel-Crafts type, such in particular as aluminum chloride and aluminum bromide. The catalysts may be used as such or deposited upon or mixed with various carrier substances such as activated alumina, activated bauxite, activated carbon, or other suitable adsorptive support materials; also modified catalysts of this type such as the mixtures of aluminum halides with other metal halides either in the solid or molten state, or the like. Particularly effective catalysts comprise aluminum chloride dissolved in a mixture of molten metal halides such as, for instance, molten mixtures comprising $AlCl_3$—$NaCl$—$KCl$, $AlCl_3$—$SbCl_3$, $AlCl_3$—$NaCl$—$ZnCl_2$, $AlCl_3$—$SO_2$—$ZnCl_2$ and the like. Other suitable catalysts comprise a halide salt of aluminum in admixture with a halide salt of a cyclic nitrogen base such as, for example, aluminum chloride in admixture with pyridine hydrogen chloride.

The isomerization is preferably executed in the presence of a hydrogen halide promoter, such as, for example, hydrogen chloride. The amount of hydrogen chloride used may vary widely in accordance with operating conditions. In general an amount of hydrogen chloride equal to from about 0.3% to about 40% of the hydrocarbon charge is found to be sufficient. Higher proportions of the hydrogen chloride may, however, be used. The isomerization reaction may be executed in either the vapor or liquid phase. Isomerization of the more stable hydrocarbons such as, for example, the conversion of butane to isobutane is generally preferably carried out in the vapor phase in the presence of a supported catalyst. Isomerization of the more readily degraded hydrocarbons such as the open chain paraffinic hydrocarbons having at least five carbon atoms to the molecule, particularly pentane and the branched chain hydrocarbons is generally executed in the liquid phase. The temperature of operation is generally dependent upon the particular catalyst used and the nature of the hydrocarbon treated. When isomerizing more stable hydrocarbons in the vapor phase, temperatures in the range of from about 50° C. to about 200° C. and preferably from about 80° C. to about 150° C. are generally employed. Isomerization of the more readily degraded saturated hydrocarbons in the liquid phase is usually effected at somewhat lower temperatures. Suitable temperatures comprise, for example, about 0° C. to about 150° C. It is to be pointed out that operating temperatures have been largely limited by the scope of the accompanying decomposition reaction and that consequently the present invention enables efficient operation at somewhat higher temperatures than possible heretofore in the absence of hydrocarbon decomposition suppressors. The isomerization reaction may be executed at subatmospheric, atmospheric, or superatmospheric pressures. In the case of liquid phase operation a sufficiently high superatmospheric pressure is, of course, maintained to keep at least a substantial part of the reactants in the liquid phase.

The hydrogen-donor introduced into the reaction zone in accordance with the invention may comprise broadly an aromatic compound capable of liberating hydrogen under the isomerization conditions employed. Suitable hydrogen-donors comprise organic compounds containing an aromatic radical having attached directly to the aromatic nucleus, more than one hydroxy or amino groups, or a hydroxyl and an amino group. Other hydrogen atoms in the aromatic nucleus may be replaced by suitable organic constituents. There is a marked difference, however, in the ease with which the side chains are cleaved from an aromatic nucleus in the presence of Friedel-Crafts type catalysts, larger alkyl chains being separated far more readily than the shorter side chains. Even though the hydrogen-donors need be introduced into the reaction zone in such relatively small amounts that any products resulting from their decomposition would have only a minor influence on catalyst activity, the use of aromatic compounds, the aromatic nucleus of which contains long side chains, is generally not preferred. Thus of the suitable hydrogen-donors, the aromatic nuclei of which contain side chains, the use of those containing not more than three and preferably not more than two carbon atoms in the longest unbroken side chain is generally more desirable.

While no attempt is made to enumerate or classify all of the aromatic hydrogen-donors which may suitably be used within the scope of the invention, the following are cited as specific examples. Suitable phenolic-type hydrogen-donors comprise, hydroquinone, pyrogallol, phloroglucinol, catechol, resorcinol, and the like, as well as their homologues and analogues and suitable substitution products as chlorhydroquinone, dichlorhydroquinone, etc. Suitable aromatic hydrogen-donors comprising the amino group include amino phenol, 2-4 diaminophenol, para-methyl aminophenol, 2-amino-5-hydroxy toluene, benzyl-para-aminophenol, aniline.

The amounts in which the hydrogen-donor is to be introduced into the reaction zone may vary considerably within the scope of the invention, depending upon the nature of the material treated, the specific catalyst used, and the operating conditions. A signal advantage of the invention resides, however, in the small amount of these materials which generally need be used to effect substantial reduction of hydrocarbon decomposition under the prevailing isomerization conditions. Addition of the hydrogen-donor in an amount equivalent to from about 0.001% to about 1% is generally found to be suitable. It is to be understood, however, that the invention is not necessarily limited to the introduction of any particular proportion of the hydrogen-donor to the reaction zone and substantially larger proportions than those specified above may be used. The hydrogen-donor may be added directly to the charge or may be introduced separately into the reaction zone. It may be added as such or in any other form comprising, for example, its solution or suspension in, or its admixture with a suitable medium. The addition may be made continuously or intermittently during the course of the operation.

Of the hydrogen-donors mentioned above the phenols, containing more than one hydroxyl group attached to the aromatic nuclei, such as, for example, hydroquinone, are somewhat preferred. The extent to which the efficiency of the isomerization process is improved by the presence of the aromatic hydrogen-donors is exemplified by the following example:

Example 2-methyl pentane was treated with a molten mixture comprising 88.1% $SbCl_3$, 10.8% $AlCl_3$, and 1.1% NaCl at a temperature of 65° C. with a contact time of 15 minutes and a ratio of catalyst to hydrocarbon of 1 to 5 by volume. Hydrogen chloride in the amount of 36.5% by weight of the hydrocarbon charge was introduced into the reaction zone. Analysis of the product obtained is shown in table A. The experiment was repeated under substantially identical conditions with the exception that a trace of hydroquinone (substantially less than 0.1%) was added to the 2-methyl pentane charged. Analysis of the product obtained in the latter experiment is shown in table B.

|  | A | B |
|---|---|---|
| Per cent isobutane | 28 | 3 |
| Per cent isopentane | 25 | 1 |
| Per cent neohexane | 10 | 42 |
| Per cent hexanes and heavier | 37 | 54 |

47% of the material shown as hexanes and heavier in table B consisted of unconverted methyl pentane.

It is apparent from the foregoing example that the introduction of only traces of the aromatic hydrogen-donors into the reaction zone wherein the readily degraded methyl pentane was being converted to dimethyl butane reduced the amount of hydrocarbon decomposition products from about 53 per cent to about 4 per cent. It is further to be noticed that the amount of the highly desirable neo-hexane (2·2·dimethyl butane) in the product obtained was more than quadrupled. To obtain anywhere near such a reduction in hydrocarbon decomposition with the aid of added hydrogen requires the use of a partial pressure of this gas of at least 300 pounds. This necessitates the use of expensive high-pressure apparatus and entails the increased cost and difficulties involved in maintaining and recirculating this gas within the system. It is thus readily apparent that the use of the hydrocarbon decomposition inhibitors in accordance with the invention permits the realization of substantial savings in the cost of apparatus and operation. The particular advantages inherent in the invention are amply displayed in the ability to produce more efficiently and cheaply than heretofore dimethyl butane (neohexane) so highly desired in the preparation of aviation fuels from methyl pentane.

The ability of the aromatic compounds within the above-defined class to inhibit hydrocarbon decomposition in the presence of aluminum halide catalysts has been attributed to the liberation of nascent hydrogen under the condition of execution of the isomerization reaction. Though a uniformly identifying characteristic of the aromatic compounds suitable as hydrogen-donors in the process of the invention is their ability to liberate hydrogen under isomerization conditions in the presence of Friedel-Crafts type catalysts, the invention is in no wise to be limited by any theory advanced herein for the purpose of setting forth more clearly and more fully the nature of the invention.

We claim as our invention:

1. A process for isomerizing methyl pentane to dimethyl butane which comprises contacting methyl pentane in admixture with hydrogen halide at isomerizing conditions with a molten mixture of halide salts containing an uncombined aluminum halide in the absence of any added free metal in a reaction zone and avoiding substantial hydrocarbon decomposition by introducing into said reaction zone small proportions, not substantially in excess of about 1% by weight of the hydrocarbon feed, of uncombined hydroquinone.

2. A process for isomerizing methyl pentane to dimethyl butane which comprises contacting methyl pentane in admixture with hydrogen halide at isomerizing conditions with a catalyst comprising uncombined aluminum halide in the absence of any added free metal in a reaction zone and avoiding substantial hydrocarbon decomposition by introducing into said reaction zone small proportions, not substantially in excess of about 1% by weight of the hydrocarbon charge, of an uncombined hydroquinone.

3. In a process for isomerizing saturated hydrocarbons wherein an isomerizable saturated hydrocarbon having at least five carbon atoms to the molecule is contacted at isomerizing conditions in admixture with a promoting amount of hydrogen chloride with uncombined aluminum chloride in the absence of any added free metal in a reaction zone, the improvement which comprises introducing into said reaction zone small proportions, not substantially in excess of about 1% by weight of the hydrocarbon charge, of uncombined hydroquinone, thereby avoiding any substantial hydrocarbon decomposition.

4. In a process for isomerizing normal and branched chain saturated hydrocarbons having at least five carbon atoms to the molecule to branched and more highly branched chain saturated hydrocarbons respectively wherein said hydrocarbons are contacted at isomerizing conditions in admixture with a promoting amount of a hydrogen halide with a catalyst comprising an uncombined aluminum halide in the absence of any added free metal in a reaction zone, the improvement which comprises introducing into said reaction zone a controlled amount, not substantially in excess of about 1% by weight of the hydrocarbon charge, of uncombined hydroquinone, thereby avoiding any substantial hydrocarbon decomposition.

CHESTER C. CRAWFORD.
DAVID LOUIS YABROFF.